US009964151B2

(12) United States Patent
Murata et al.

(10) Patent No.: US 9,964,151 B2
(45) Date of Patent: May 8, 2018

(54) TAPERED ROLLER BEARING

(71) Applicant: JTEKT CORPORATION, Osaka-shi, Osaka (JP)

(72) Inventors: Junji Murata, Kashiba (JP); Shigeo Kamamoto, Kashiwara (JP); Yuki Shishihara, Kashiwara (JP)

(73) Assignee: JTEKT CORPORATION, Osaka-Shi (JP)

( * ) Notice: Subject to any disclaimer, the term of this patent is extended or adjusted under 35 U.S.C. 154(b) by 0 days. days.

(21) Appl. No.: 15/391,992

(22) Filed: Dec. 28, 2016

(65) Prior Publication Data
US 2017/0204909 A1   Jul. 20, 2017

(30) Foreign Application Priority Data

Jan. 14, 2016  (JP) ................... 2016-005383

(51) Int. Cl.
| | |
|---|---|
| *F16C 33/46* | (2006.01) |
| *F16C 33/58* | (2006.01) |
| *F16C 33/66* | (2006.01) |
| *F16C 19/36* | (2006.01) |

(52) U.S. Cl.
CPC ........ *F16C 33/6681* (2013.01); *F16C 19/364* (2013.01); *F16C 33/4605* (2013.01); *F16C 33/4635* (2013.01); *F16C 33/585* (2013.01); *F16C 2361/61* (2013.01)

(58) Field of Classification Search
CPC .. F16C 19/364; F16C 33/366; F16C 33/4635; F16C 33/6651; F16C 33/6681; F16C 2361/61
See application file for complete search history.

(56) References Cited

U.S. PATENT DOCUMENTS

| | | |
|---|---|---|
| 3,199,935 A | 8/1965 | Pitner |
| 3,251,118 A | 5/1966 | Pitner |
| 4,425,011 A * | 1/1984 | Cunningham ........ F16C 19/364 |
| | | 384/571 |
| 2009/0003745 A1 | 1/2009 | Tsujimoto |

(Continued)

FOREIGN PATENT DOCUMENTS

| | | | |
|---|---|---|---|
| JP | 2010174918 A * | 8/2010 | .......... F16C 33/6681 |
| JP | 2014-202341 A | 10/2014 | |

(Continued)

OTHER PUBLICATIONS

U.S. Appl. No. 15/635,523, filed Jun. 28, 2017 in the name of Yuki Shishihara et al.
Jan. 26, 2018 Office Action Issued in U.S. Appl. No. 15/635,523.

*Primary Examiner* — Phillip A Johnson
(74) *Attorney, Agent, or Firm* — Oliff PLC

(57) ABSTRACT

A tapered roller bearing includes an inner ring having an inner-ring raceway surface, an outer ring arranged radially outward of the inner ring so as to be concentric with the inner ring having an outer-ring raceway surface that faces the inner-ring raceway surface, a plurality of tapered rollers interposed between the inner-ring raceway surface and the outer-ring raceway surface; and a cage that holds the tapered rollers at predetermined intervals along a circumferential direction. A diameter of an inner peripheral surface of a small-diameter-side end of the cage is substantially the same as a diameter of a small-diameter-side pitch circle of the tapered rollers.

7 Claims, 4 Drawing Sheets

(56) References Cited

U.S. PATENT DOCUMENTS

| | | |
|---|---|---|
| 2009/0016664 A1 | 1/2009 | Tsujimoto |
| 2012/0263405 A1* | 10/2012 | Mizuki ............... F16C 33/4635 384/473 |
| 2013/0148919 A1 | 6/2013 | Matsuo et al. |
| 2015/0167742 A1 | 6/2015 | Murata et al. |
| 2015/0176649 A1 | 6/2015 | Okamoto et al. |
| 2015/0252848 A1 | 9/2015 | Suzuki |
| 2016/0265587 A1 | 9/2016 | Kamamoto et al. |

FOREIGN PATENT DOCUMENTS

| | | | |
|---|---|---|---|
| JP | 2015-102134 A | 6/2015 | |
| JP | 2015-169300 A | 9/2015 | |
| JP | 2016-089844 A | 5/2016 | |
| WO | WO-8102918 A1 * | 10/1981 | ............ F16C 19/364 |
| WO | WO-2009017159 A1 * | 2/2009 | ............ F16C 19/364 |

* cited by examiner

TAPERED ROLLER BEARING

INCORPORATION BY REFERENCE

The disclosure of Japanese Patent Application No. 2016-005383 filed on Jan. 14, 2016 including the specification, drawings and abstract, is incorporated herein by reference in its entirety.

BACKGROUND OF THE INVENTION

1. Field of the Invention

The invention relates to a tapered roller bearing.

2. Description of Related Art

As a rolling bearing configured to support a pinion shaft of a differential gear apparatus mounted in an automobile, for example, a tapered roller bearing described in Japanese Patent Application Publication No. 2015-169300 (JP 2015-169300 A) is known. The tapered roller bearing includes an inner ring 101, an outer ring 102, a plurality of tapered rollers 103, an annular cage 104, as depicted in FIG. 4. The tapered rollers 103 are interposed between the inner and outer rings 101, 102 in a rollable manner. The cage 104 holds the tapered rollers 103 at regular intervals in a circumferential direction.

A labyrinth clearance is formed between an inner peripheral surface 104a of a small-diameter-side end of the cage 104 and an outer peripheral surface 101a of the inner ring 101. A pump action resulting from rotation of the tapered roller bearing allows a lubricant to flow into a bearing interior through the labyrinth clearance. This allows suppression of excessive feeding of the lubricant to the bearing interior, reducing rotational resistance to the tapered roller bearing (stirring resistance of the lubricant).

In a tapered roller bearing configured to support a pinion shaft of a differential gear apparatus mounted in industrial equipment, the lubricant is less likely to be fed to the bearing interior. Thus, for the tapered roller bearing for industrial equipment, suppressing a rise in bearing temperature caused by insufficient lubrication is desired rather than reducing the rotational resistance to the bearing as described above.

An object of the invention is to provide a tapered roller bearing that allows suppression of a rise in bearing temperature caused by insufficient lubrication.

A tapered roller bearing in an aspect of the invention includes an inner ring having an inner-ring raceway surface, an outer ring arranged radially outward of the inner ring so as to be concentric with the inner ring and having an outer-ring raceway surface that faces the inner-ring raceway surface, a plurality of tapered rollers interposed between the inner-ring raceway surface and the outer-ring raceway surface, and a cage that holds the tapered rollers at predetermined intervals along a circumferential direction. A diameter of an inner peripheral surface of a small-diameter-side end of the cage is substantially the same as a diameter of a small-diameter-side pitch circle of the tapered rollers.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described below in detail with reference to the attached drawings.

Figure 1:
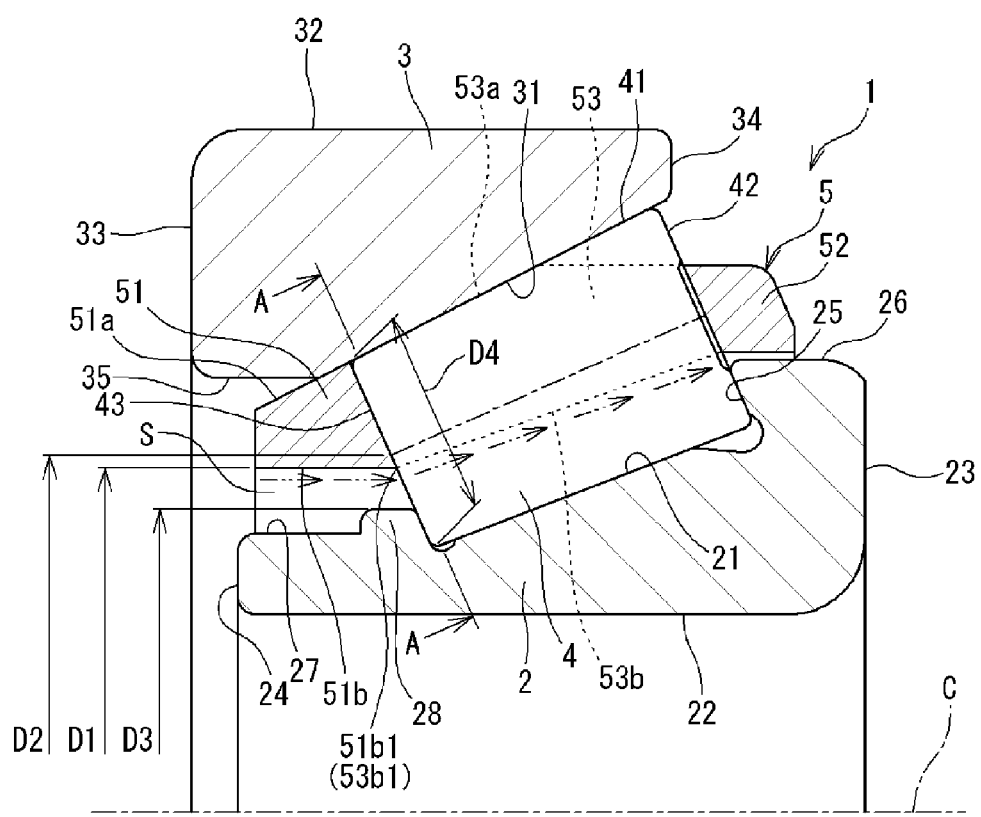
FIG. 1 is an axial sectional view depicting a tapered roller bearing according to an embodiment of the invention.

FIG. 1 is an axial sectional view depicting a tapered roller bearing according to an embodiment of the invention. A tapered roller bearing 1 in the present embodiment is used, for example, to support a pinion shaft of a differential gear apparatus mounted in industrial equipment. The tapered roller bearing 1 has an inner ring 2, an outer ring 3, a plurality of tapered rollers (rolling elements) 4, and a cage 5 that holds the tapered rollers 4. The inner ring 2, the outer ring 3, and the cage 5 are annular (short-cylinder-shaped) members centered around a common axis C.

The inner ring 2 has an inner-ring raceway surface 21 on an outer periphery thereof and is provided with a cylindrical inner peripheral surface 22. At opposite ends of the inner ring 2 in the axial direction, a large end face 23 and a small end face 24 are each formed as a flat surface perpendicular to the axis C. The inner-ring raceway surface 21 is shaped like a circular cone. On a large diameter side (a right side in FIG. 1) of the inner-ring raceway surface 21, a cone back face rib face (hereinafter, referred to as a large rib face) 25 is formed so as to extend in a direction that is generally orthogonal to the inner-ring raceway surface 21 in an axial section (a section including the axis C). A large cylindrical surface 26 is formed between a radially outer end of the large rib face 25 and a radially outer end of the large end face 23.

A small cylindrical surface 27 coaxial with the axis C is formed on a part of an outer periphery of the inner ring 2 on the small end face 24 side. Between the small cylindrical surface 27 and the inner-ring raceway surface 21, a cone front face rib (hereinafter, referred to as a small rib) 28 is formed which is slightly larger in outside diameter than the small cylindrical surface 27. The inner ring 2 is produced using bearing steel. For the inner ring 2, after quench hardening, the following are each finished by grinding: the inner-ring raceway surface 21, the inner peripheral surface 22, the large end face 23, the small end face 24, the large rib face 25, the large cylindrical surface 26, the small cylindrical surface 27, and the small rib 28.

The outer ring 3 has an outer-ring raceway surface 31 on an inner periphery thereof and is provided with a cylindrical outer peripheral surface 32. At opposite ends of the outer ring 3 in the axial direction, a large end face 33 and a small end face 34 are each formed as a flat surface perpendicular to the axis C. The outer-ring raceway surface 31 is shaped like a circular cone, and a small-diameter-side end of the outer-ring raceway surface 31 (a left side in FIG. 1) is continuous with an inner-peripheral cylindrical surface 35 formed coaxially with the axis C. The outer ring 3 is produced using bearing steel. For the outer ring 3, after quench hardening, the following are each finished by grinding: the outer-ring raceway surface 31, the outer peripheral surface 32, the large end face 33, the small end face 34, and the inner-peripheral cylindrical surface 35.

The tapered rollers 4 are each shaped generally like a truncated cone and each have an outer peripheral rolling surface 41 that is ground into a truncated cone shape. The inner ring 2 and the outer ring 3 are concentrically assembled together such that the inner-ring raceway surface 21 and the outer-ring raceway surface 31 face each other in a radial direction. The tapered rollers 4 are assembled between the inner-ring raceway surface 21 and the outer-ring raceway surface 31 in a rollable manner. The tapered rollers 4 each include a large-diameter-side end face 42 and a small-diameter-side end face 43, and the large-diameter-side end face 42 is ground and is in slidable contact with the large rib face 25 of the inner ring 2.

The cage 5 is produced by injection molding a synthetic resin. A small-diameter circular ring portion 51 and a large-diameter circular ring portion 52, which are arranged away from each other in an axial direction, are coupled together via a plurality of cage bars 53 arranged at regular intervals in a circumferential direction (see also FIG. 3). A pocket 54 (see FIG. 3) in which one tapered roller 4 is housed is formed as a space enclosed by the cage bars 53 adjacent to each other in the circumferential direction, the small-diameter circular ring portion 51, and the large-diameter circular ring portion 52. Consequently, the cage 5 holds the tapered rollers 4 at regular intervals along the circumferential direction.

An outer peripheral surface 51a of the small-diameter circular ring portion 51 of the cage 5 and an outer peripheral surface 53a of the cage bar 53 are formed as curved surfaces along the outer-ring raceway surface 31 and are in slidable contact with the outer-ring raceway surface 31. Consequently, when the inner ring 2 rotates to allow the tapered rollers 4 to make revolving motion, the cage 5 is guided along the outer-ring raceway surface 31 to revolve, and rotates coaxially with the inner ring 2 and the outer ring 3. A pump action resulting from rotation of the tapered roller bearing 1 allows a lubricant to flow into a bearing interior through a space between an inner peripheral surface 51b of the small-diameter circular ring portion 51, which is a small-diameter-side end of the cage 5, and a small-end-face-24-side outer peripheral surface (outer peripheral surfaces of the small cylindrical surface 27 and the small rib 28; this also applies to the following description) of the inner ring 2.

The inner peripheral surface 51b of the small-diameter circular ring portion 51 of the cage 5 is a flat surface that is generally parallel to the axis C all over the length of the inner peripheral surface 51b in the axial direction as viewed in axial section. A cage-bar-53-side edge 51b1 of the inner peripheral surface 51b of the small-diameter circular ring portion 51 is connected to a small-diameter circular-ring-portion-51-side edge 53b1 of the inner peripheral surface 53b of each of the cage bars 53 so as to form no step.

Figure 4:
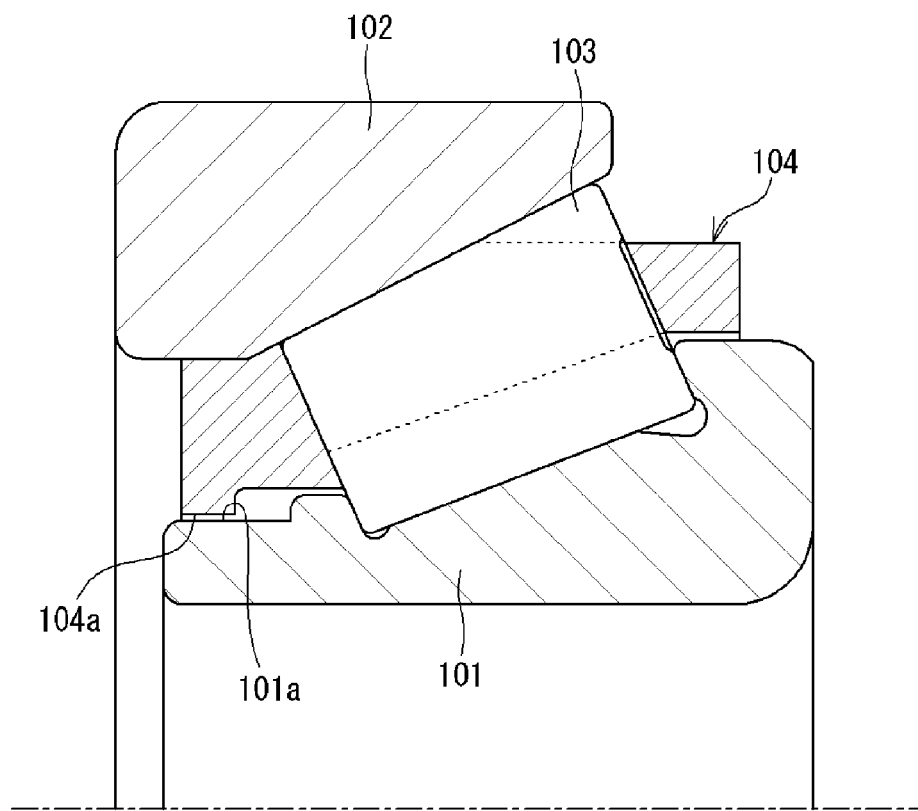
FIG. 4 is an axial sectional view depicting a conventional tapered roller bearing.

A diameter D1 of the inner peripheral surface 51b of the small-diameter circular ring portion 51 is substantially the same as a small-diameter-side pitch circle diameter D2 of the tapered rollers 4. The small-diameter-side pitch circle diameter refers to the diameter of a circle connecting the centers of the small-diameter-side end faces 43 of the tapered rollers 4 together in the tapered roller bearing 1. On the other hand, the maximum diameter D3 of a small-end-face-24-side outer peripheral surface of the inner ring 2 is substantially the same as the corresponding maximum diameter in a conventional tapered roller bearing (see FIG. 4). Consequently, a space larger than the corresponding space in the conventional tapered roller bearing is formed between the inner peripheral. surface 51b of the small-diameter circular ring portion 51 and the small-end-face 24-side outer periphery of the inner ring 2; the space corresponds to an inlet for the lubricant.

The diameter D1 of the inner peripheral surface 51b of the small-diameter circular ring portion 51 is set so as to satisfy the following relational expression.

$$D2-(2\times 0.3\times D4) \geq D1 \geq D2+(2\times 0.3\times D4)$$

The diameter of the small-diameter-side end face 43 of each tapered roller 4 is denoted by D4.

Figure 2:
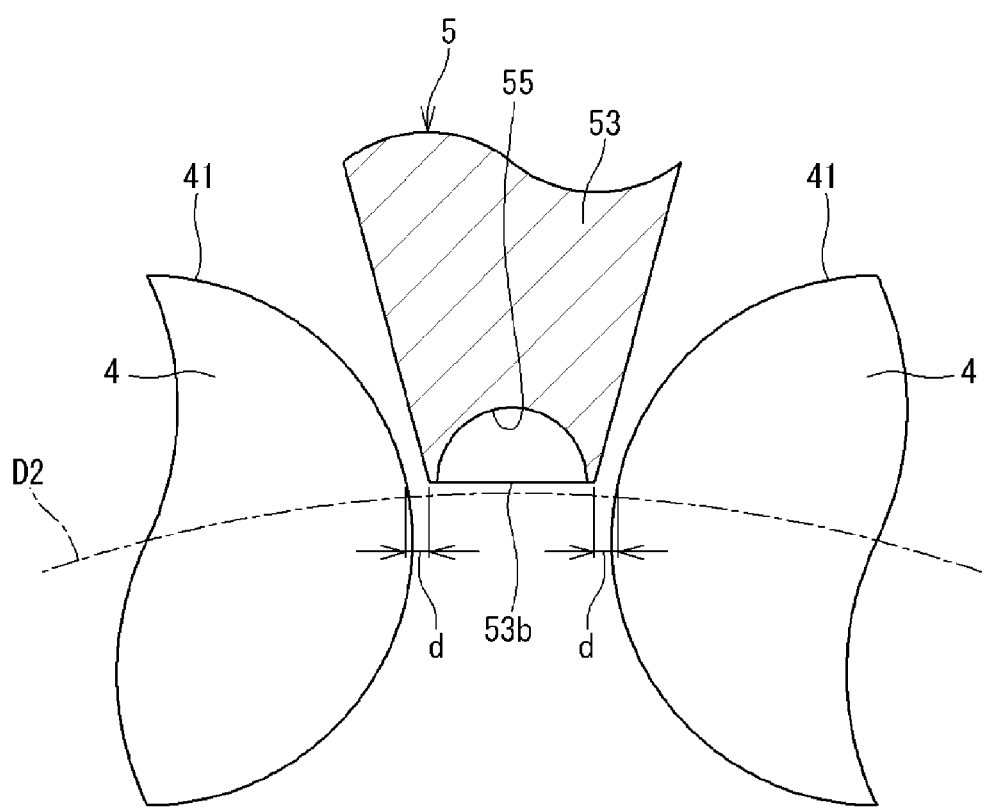
FIG. 2 is an enlarged circumferential sectional view taken along line A-A in FIG. 1 and depicting a small-diameter circular-ring-portion-side end of each cage bar of a cage.

FIG. 2 is an enlarged circumferential sectional view taken along line A-A in FIG. 1 and depicting a small-diameter circular-ring-portion-51-side end of each cage bar 53 of the cage 5. The diameter D1 of the inner peripheral surface 51b of the small-diameter circular ring portion 51 is set so as to satisfy the above-described relational expression. Thus, as depicted in FIG. 2, the inner peripheral surface 53b of the cage bar 53 formed to be continuous with the inner peripheral surface 51b is formed near the pitch circle diameter D2 of the tapered rollers 4.

The above-described configuration reduces a clearance d between a circumferential end of the inner peripheral surface 53b of each cage bar 53 and the rolling surface 41 of the adjacent tapered roller 4. This allows the lubricant to be restrained from flowing into an upper side part of FIG. 2. As a result, the lubricant can be efficiently fed to a slidable contact portion between the large-diameter-side end face 42 of the tapered roller 4 and the large rib face 25 of the inner ring 2 along the inner peripheral surface 51b of the small-diameter circular ring portion 51 and then the inner peripheral surface 53b of the cage bar 53 as depicted by long dashed double-short dashed arrows in FIG. 1.

Figure 3:
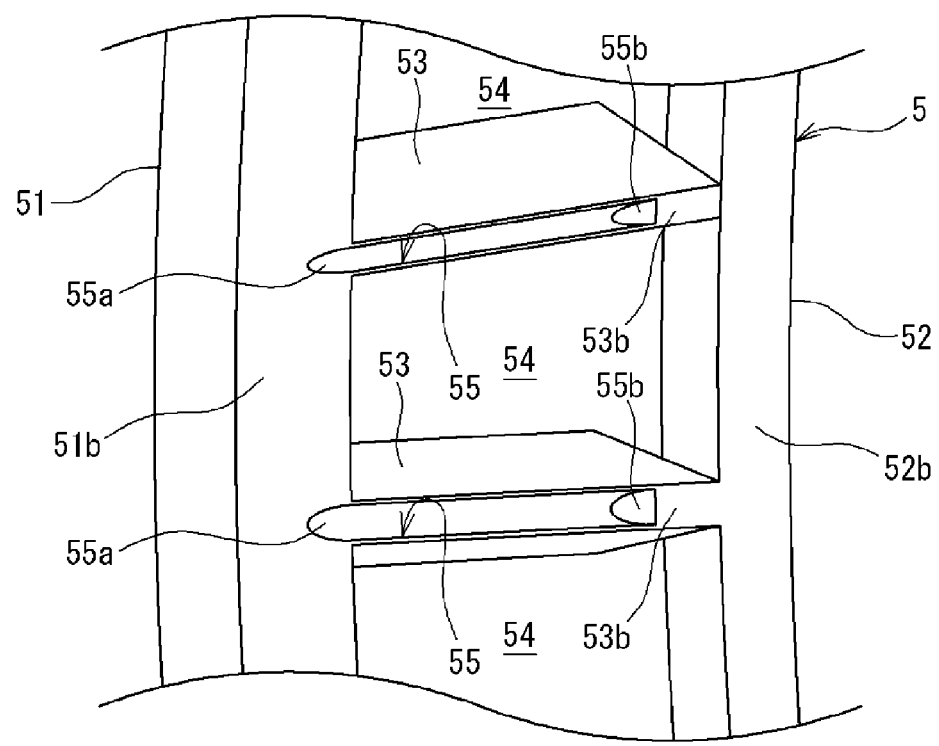
FIG. 3 is a perspective view depicting an inner peripheral surface of the cage.

FIG. 3 is a perspective view depicting an inner peripheral surface of the cage 5. As depicted in FIG. 3, a groove portion 55 through which the lubricant is guided is formed in the inner peripheral surface 53b of each cage bar 53 of the cage 5 (see also FIG. 2). An axially first end 55a of the groove portion 55 extends to the inner peripheral surface 51b of the small-diameter circular ring portion 51. At an axially second end of the groove portion 55, a tapered surface 55b is formed which is inclined from a bottom surface of the groove portion 55 toward the inner peripheral surface 53b of the cage bar 53. Thus, the lubricant on the inner peripheral surface 51b of the small-diameter circular ring portion 51 is guided into the groove portion 55 through the axially first end 55a of the groove portion 55 and then from the axially second end of the groove portion 55 along the tapered surface 55b to the large-diameter circular ring portion 52.

As described above, in the tapered roller bearing 1 in the present embodiment, the diameter D1 of the inner peripheral surface 51b of the small-diameter circular ring portion 51 of the cage 5 is substantially the same as the small-diameter-side pitch circle diameter D2 of the tapered rollers 4. Thus, the large space S is formed between the inner peripheral surface 51b of the cage 5 and the outer peripheral surface of the inner ring 2, which faces the inner peripheral surface 51b. This facilitates the lubricant to flow into the bearing interior through the space S, allowing suppression of a rise in bearing temperature caused by insufficient lubrication in the bearing interior.

No step is formed at the connection between the inner peripheral surface 51b of the small-diameter circular ring portion 51 of the cage 5 and the inner peripheral surface 53b of each cage bar 53. Thus, the lubricant can move smoothly from the inner peripheral surface 51b of the small-diameter circular ring portion 51 toward the inner peripheral surface 53b of the cage bar 53. This further facilitates the lubricant to flow from the space S into the bearing interior.

The lubricant is guided along the groove portion 55 formed in the inner peripheral surface 53b of each cage bar 53 of the cage 5. Consequently, the lubricant can be more smoothly migrated from the inner peripheral surface 51b of the small-diameter circular ring portion 51 toward the inner peripheral surface 53b of the cage bar 53. This further facilitates the lubricant to flow from the space S into the bearing interior.

The disclosed embodiment is illustrative and is not restrictive. The scope of right of the invention is indicated by the claims, and includes the configurations in the claims and all variations within the range of equivalency. For example, the cage 5 in the present embodiment is rotationally guided by the outer ring 3 (outer-ring raceway surface 31). However, the cage 5 may be rotationally guided by the tapered rollers 4.

The tapered roller bearing in the invention allows suppression of a rise in bearing temperature caused by insufficient lubrication.

What is claimed is:

1. A tapered roller bearing comprising:
    an inner ring having an inner-ring raceway surface;
    an outer ring arranged radially outward of the inner ring so as to be concentric with the inner ring and having an outer-ring raceway surface that faces the inner-ring raceway surface;
    a plurality of tapered rollers interposed between the inner-ring raceway surface and the outer-ring raceway surface;
    a cage that holds the tapered rollers at predetermined intervals along a circumferential direction, wherein
    a diameter of an inner peripheral surface of a small-diameter-side end of the cage is substantially the same as a diameter of a small-diameter-side pitch circle of the tapered rollers,
    a groove portion through which a lubricant is guided is formed in the inner peripheral surface of each of a plurality of cage bars of the cage so as to extend in the axial direction, and
    a tapered surface is formed at an axial first end of the groove portion, the tapered surface is inclined from a bottom surface of the groove portion toward the inner peripheral surface of one of the plurality of cage bars.

2. The tapered roller bearing according to claim 1, wherein:
    the cage has a small-diameter circular ring portion and a large-diameter circular ring portion arranged away from each other in an axial direction,
    the plurality of cage bars couple the small-diameter circular ring portion and the large-diameter circular ring portion,
    pockets housing the tapered rollers are each formed as a space between cage bars adjacent to each other in the circumferential direction, and
    the inner peripheral surface of the small-diameter circular ring portion is connected to an inner peripheral surface of each of the cage bars so as to form no step.

3. The tapered roller bearing according to claim 2, wherein an axially second end of the groove portion extends to the inner peripheral surface of the small-diameter circular ring portion.

4. The tapered roller bearing according to claim 1, wherein the diameter of the inner peripheral surface of the small-diameter circular ring portion is set so as to satisfy the following relational expression: $D2-(2\times0.3\times D4)\leq D1\leq D2+(2\times0.3\times D4)$, where $D1$ is the diameter of the inner peripheral surface of the small-diameter circular ring portion, $D2$ is the diameter of a small-diameter-side pitch circle of the tapered rollers and $D4$ is a diameter of a small-diameter-side end face of each tapered roller.

5. The tapered roller bearing according to claim 1, wherein a small cylindrical surface coaxial with an axis of the inner ring is formed on an outer periphery of the inner ring on a small end face side of the inner ring, and a rib is formed which is larger in outside diameter than the small cylindrical surface, the rib being spaced apart from the small-diameter circular ring portion to facilitate flow of the lubricant into a bearing interior.

6. A tapered roller bearing comprising:
    an inner ring having an inner-ring raceway surface;
    an outer ring arranged radially outward of the inner ring so as to be concentric with the inner ring and having an outer-ring raceway surface that faces the inner-ring raceway surface;
    a plurality of tapered rollers interposed between the inner-ring raceway surface and the outer-ring raceway surface; and
    a cage that holds the tapered rollers at predetermined intervals along a circumferential direction, wherein
    a diameter of an inner peripheral surface of a small-diameter-side end of the cage is substantially the same as a diameter of a small-diameter-side pitch circle of the tapered rollers, and
    wherein the diameter of the inner peripheral surface of the small-diameter circular ring portion is set so as to satisfy the following relational expression:
    $D2-(2\times0.3\times D4)\leq D1\leq D2+(2\times0.3\times D4)$, where $D1$ is the diameter of the inner peripheral surface of the small-diameter circular ring portion, $D2$ is the diameter of a small-diameter-side pitch circle of the tapered rollers and $D4$ is a diameter of a small-diameter-side end face of each tapered roller.

7. A tapered roller bearing comprising:
    an inner ring having an inner-ring raceway surface;
    an outer ring arranged radially outward of the inner ring so as to be concentric with the inner ring and having an outer-ring raceway surface that faces the inner-ring raceway surface;
    a plurality of tapered rollers interposed between the inner-ring raceway surface and the outer-ring raceway surface; and
    a cage that holds the tapered rollers at predetermined intervals along a circumferential direction, wherein
    a diameter of an inner peripheral surface of a small-diameter-side end of the cage is substantially the same as a diameter of a small-diameter-side pitch circle of the tapered rollers, and
    a small cylindrical surface coaxial with an axis of the inner ring is formed on an outer periphery of the inner ring on a small end face side of the inner ring, and a rib is formed which is larger in outside diameter than the small cylindrical surface, the rib being spaced apart from the small-diameter circular ring portion to facilitate flow of the lubricant into a bearing interior.

* * * * *